(12) United States Patent
Jakobsson et al.

(10) Patent No.: US 10,791,126 B2
(45) Date of Patent: *Sep. 29, 2020

(54) SYSTEM AND METHODS FOR PROTECTING USERS FROM MALICIOUS CONTENT

(71) Applicant: PayPal, Inc., San Jose, CA (US)

(72) Inventors: Bjorn Markus Jakobsson, Mountain View, CA (US); William Leddy, Georgetown, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,168

(22) Filed: Apr. 9, 2019

(65) Prior Publication Data

US 2019/0372994 A1 Dec. 5, 2019

Related U.S. Application Data

(63) Continuation of application No. 15/012,309, filed on Feb. 1, 2016, now Pat. No. 10,257,209, which is a continuation of application No. 13/339,275, filed on Dec. 28, 2011, now Pat. No. 9,286,449.

(60) Provisional application No. 61/435,210, filed on Jan. 21, 2011.

(51) Int. Cl.
*G06F 21/00* (2013.01)
*H04L 29/06* (2006.01)
*G06F 21/56* (2013.01)
*G06F 21/83* (2013.01)

(Continued)

(52) U.S. Cl.
CPC ............ *H04L 63/123* (2013.01); *G06F 13/24* (2013.01); *G06F 21/31* (2013.01); *G06F 21/56* (2013.01); *G06F 21/83* (2013.01); *H04L 63/083* (2013.01); *H04L 63/145* (2013.01); *G06F 2221/2119* (2013.01)

(58) Field of Classification Search
CPC ..................................................... H04L 63/123
See application file for complete search history.

(56) References Cited

U.S. PATENT DOCUMENTS

| 7,698,744 B2 * | 4/2010 | Fanton | H04L 63/08 726/27 |
| 8,984,628 B2 * | 3/2015 | Mahaffey | G06F 21/564 726/22 |

(Continued)

*Primary Examiner* — Josnel Jeudy
(74) *Attorney, Agent, or Firm* — Haynes and Boone, LLP (57) ABSTRACT

A method, system and device for allowing the secure collection of sensitive information is provided. The device includes a display, and a user interface capable of receiving at least one user-generated interrupt in response to a stimulus generated in response to content received by the device, wherein the action taken upon receiving the user-generated interrupt depends on a classification of the content, the classification identifying the content as trusted or not trusted. The method includes detecting a request for sensitive information in content, determining if an interrupt is generated, determining if the content is trusted, allowing the collection of the sensitive information if the interrupt is generated and the content is trusted, and performing an alternative action if the interrupt is generated and the content is not trusted. The method may include instructions stored on a computer readable medium.

20 Claims, 9 Drawing Sheets

(51) Int. Cl.
*G06F 21/31* (2013.01)
*G06F 13/24* (2006.01)

(56) References Cited

U.S. PATENT DOCUMENTS

| | | | | |
|---|---|---|---|---|
| 2006/0117177 A1* | 6/2006 | Buer | ................... | G06F 21/72 |
| | | | | 713/155 |
| 2008/0034092 A1* | 2/2008 | Kikuchi | ................ | H04L 63/102 |
| | | | | 709/225 |
| 2009/0300768 A1* | 12/2009 | Krishnamurthy | ... | H04L 63/1483 |
| | | | | 726/26 |
| 2011/0247045 A1* | 10/2011 | Rajagopal | ............... | G06F 21/35 |
| | | | | 726/1 |
| 2012/0192277 A1* | 7/2012 | Jakobsson | ............. | H04L 63/123 |
| | | | | 726/24 |

* cited by examiner

SYSTEM AND METHODS FOR PROTECTING USERS FROM MALICIOUS CONTENT

RELATED APPLICATIONS

This application is a continuation application of U.S. Utility application Ser. No. 15/012,309 filed Feb. 1, 2016, which is a continuation application of U.S. Utility application Ser. No. 13/339,275 filed on Dec. 28, 2011 which claims priority to U.S. Provisional Application 61/435,210, filed on Jan. 21, 2011, all of which are incorporated herein by reference in their entirety.

BACKGROUND

Technical Field

Embodiments disclosed herein are related to systems and methods for increasing internet security. In particular, systems and methods disclosed herein may leverage a user's conditioning to execute a particular action when presented with a stimulus to terminate malicious content when the particular action provides a beneficial result for safe and trusted content.

Related Art

As people use the internet for more and more reasons, scammers and so-called "black-hat" hackers increasingly look to the internet as a new frontier of illicit opportunity. People who use the internet to conduct financial transactions, such as making purchases and banking, can be attacked by the scammers and hackers and can be tricked into unwittingly divulging important personal information, such as login information, passwords, bank account information, and credit card numbers. The attackers can use this information for their financial gain, which can hurt the financial standing and credit rating of the people whose information is stolen.

One example of a known method used by attackers to obtain the personal information of internet users is called a "man-in-the-middle" attack. The "man-in-the-middle" attack is a type of abuse in which a proxy is used to intercept, modify and forward the internet traffic between one or more parties attempting to communicate or transact with one another. The attacking "man-in-the-middle" effectively "gets between" the one or more parties so that while it appears that the parties are establishing connections between one another, they are actually establishing a connection with the attacker. The attacker can thus intercept or even change data, such as personal data and financial data by impersonating the one or more parties to each other, compromising the security of internet communications and transactions. In many cases, these so-called "man-in-the-middle" attacks typically result from vulnerable security protocols.

Another common attack is what is known as a "man-in-the-browser" attack. In this attack, the proxy resides in a browser of one of the one or more parties as a client. "Man-in-the-browser" attacks can be problematic as they defy traditional efforts to detect the presence of a proxy using heuristics such as an IP address, machine identification number, or media access control (MAC) address of a machine because the proxy cannot be distinguished from the client by a server. Often, these so-called "man-in-the browser" attacks result from vulnerability in the code of the browser or operating systems, or other software vulnerabilities permitting infection of the client.

The variety and portability of internet-capable device have resulted in not only users being capable of performing internet communications and transactions more frequently, but also in the opportunity for attackers to trick users into giving them personal information and financial data. The lucrative potential that these attacks present the attackers encourages attackers to try and stay one or more steps ahead of the security. When a countermeasure or other security provision is put into place to stop or otherwise limit the effect of an attack, the attackers develop ways to overcome the countermeasure, or find additional ways to exploit the operating system, browser or other executable software to launch another, possibly more effective attack.

Accordingly, there is a need for a system and method that provides a system, method, and device that thwarts attacks by denying an attack using a user-conditioned response to a stimulus.

SUMMARY

Consistent with some embodiments, there is provided a device for allowing the secure collection of sensitive information. The device includes a display, and a user interface capable of receiving at least one user-generated interrupt in response to a stimulus generated in response to content received by the device, wherein the action taken upon receiving the user-generated interrupt depends on a classification of the content, the classification identifying the content as trusted or not trusted.

Further consistent with some embodiments, there is provided a method for allowing the collection of sensitive information. The method includes detecting a request for sensitive information in content, determining if an interrupt is generated, determining if the content is trusted, allowing the collection of the sensitive information if the interrupt is generated and the content is trusted, and performing an alternative action if the interrupt is generated and the content is not trusted.

These and other embodiments will be described in further detail below with respect to the following figures.

BRIEF DESCRIPTION OF THE FIGURES

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

A type of attack that is not well known and has the potential to be just as effective, if not more effective than the attacks mentioned previously, is a "man-in-the-screen" attack. A "man-in-the-screen" attack is easy to implement and difficult to detect—both for end users and for software attempting to detect and block the attack. The "man-in-the-screen" attack can be executed in a number of ways, including by spoofing a web page or by spoofing an executing application. In the web spoofing scenario, the attacker produces a webpage that resembles a known webpage. In some cases, the attacker may go so far as to produce a webpage that resembles a home screen of a mobile device such as an iPhone™ or other smartphone based on the Android, webOS, Windows Mobile, or BlackBerry OS operating systems. For example, an attacker may make the webpage look like it includes familiar icons that a user would find on the home screen of the mobile device. The malicious webpage may also include code that hides the address bar when displayed, thus, improving the subterfuge. The displayed "icons" may then include a hyperlink that directs the user to a webpage that mimics the attributes of the program that the "icon" would normally represent. However, any personal information entered into the program would be captured by the webpage and forwarded to the attacker. Alternatively, the displayed "icons" may be non-functional when pressed such that the user believes that the smartphone has malfunctioned. The malicious webpage could then include code which causes a login prompt requiring a user to login into a personal account related to the smartphone (e.g., iTunes™ account for iOS™ based smartphones, or Google™ or Android Market™ accounts for Android based phones, or Windows™ Marketplace™ for Windows Mobile-based phones). The malicious webpage could also include code which causes a login prompt requiring a user to login into a financial account, such as a bank account or a payment provider such as PayPal. Moreover, the attacker could analyze information about the smartphone to determine what applications are installed, such as financial applications, password manager applications, or other applications which use and store important and fungible user information. Then, the attacker can display apparent popups to the user asking the user to input passwords for these applications, and collect the passwords that the user enters. Similar types of attacks can be envisioned, but are not easy to detect using traditional means, since it is hard for software to determine how a webpage would be rendered and understood by an end user and, thus, to determine whether this is abusive or intends to defraud.

Although it may be difficult to detect this type of malicious attack using software, the intent, whether benevolent or malicious, may be detected using security provisions provided through the operating system (i.e., OSX, Linux, Windows), or a security service provider (e.g., "https:" using secure sockets layer (SSL) or other certificate-requiring service). Certificates and recognizable secure interfaces may be granted to companies or organizations providing a benevolent interface or webpage by carefully scrutinizing their history and requests to display a secure interface or receive a certificate indicating security. Consequently, secure interfaces and security certificates are only granted to those who are trusted to do so, and the information may be tied (using text, logos, animation, audio, interaction) to the "secure user interface" behavior by means of cryptographic authentications (such as digital signatures), or by secure configurations of software. After a company or organization has been granted their request to display a secure interface or their request for a certificate, they can do this until the certification ends. This may be a matter of time, a certain number of verifications, a certain number of sales or logins, a certain number of users accessing the interface, or a function of a combination of all of these. Certified, trusted applications and webpages may be identified by a device using digital certificates. However, consistent with some embodiments, other forms of message content authentication may be used, such as standard symmetric message authentication codes, where an authority would share a key with each registered device, or with an entity that corresponds to a small number of registered devices. Consistent with other embodiments, a combination of authentication methods, and some of the authentications can be provided by one authority, while other authentications can be provided by another authority.

Consistent with some embodiments, granting a request for the display of a secure interface or for a certificate may also allow the company or organization to have their interface or webpage on a so-called "whitelist". A "whitelist" is a list or register of approved entities that are provided a particular privilege, access or recognition. On the other hand, according to some embodiments, known malicious websites and interfaces may be placed on a "blacklist", which is a list or register of known malicious entities such that privilege access or recognition is denied to the blacklisted entities. According to some embodiments, one or more clearinghouse may maintain which websites, domains, and interfaces are placed on the blacklist and the whitelist and the clearinghouse may provide the whitelist and blacklist to the public. Moreover, the whitelist and blacklist may be dynamically generated.

Figure 1:
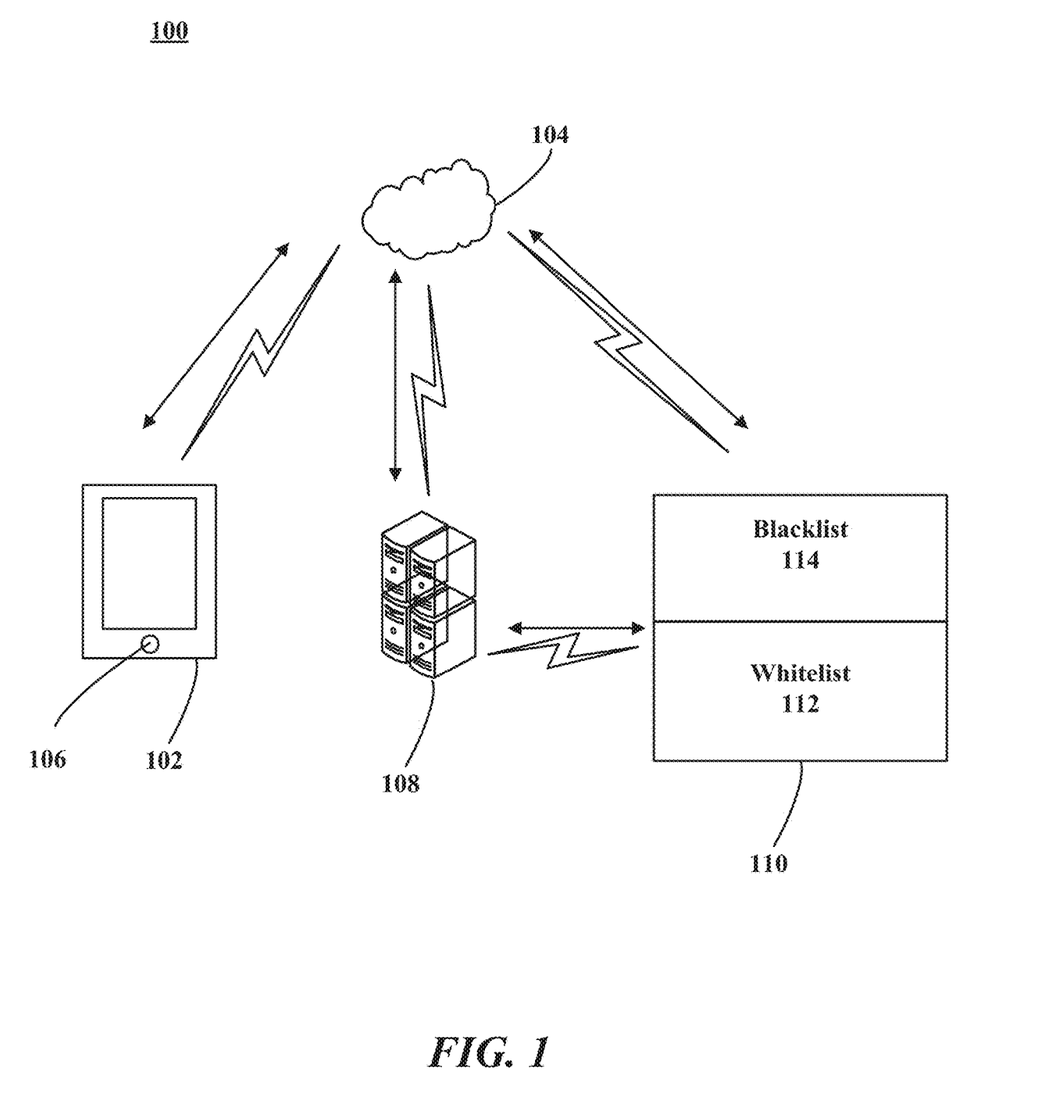
FIG. 1 is an illustration of a system consistent with some embodiments.

FIG. 1 is an illustration of a system 100 consistent with some embodiments. As shown in FIG. 1, an internet-capable device 102 is coupled to a network 104. Consistent with some embodiments, network 104 may correspond to the internet, a local area network (LAN), or a wide area network (WAN). The connection may be wireless through a wireless data protocol such as Wi-Fi™, 3G, 4G, HDSPA, LTE, RF, NFC, or through a wired connection. Consistent with some embodiments, device 102 may include any appropriate combination of hardware and/or software having a processor and capable of reading instructions stored on a non-transitory machine-readable medium for execution by the processor. Consistent with some embodiments device 102 includes a machine-readable medium, such as a memory (not shown) that includes instructions for execution by a processor (not shown) for causing device 102 to perform specific tasks. For example, such instructions may include displaying content, such as a web page or a user interface. Further, content may be content displayed by a particular application or "app" stored in a memory of device 102 and executed by a processor executing in device 102. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above, device 102 may be a mobile device such as a smartphone such as an iPhone™ or iPad™ or other mobile device running the iOS™ operating system, the Android™ operating system, a BlackBerry™ operating system, a Windows™ Mobile operating system, or webOS™. Device 102 may also be a personal computer, laptop computer, netbook, or tablet computer. Device 102 includes an interrupt mechanism 106 which, when engaged by a user, generates an interrupt on device 102. Although interrupt mechanism 106 is shown as a button in FIG. 1, interrupt mechanism may be any mechanism that causes a hardware or software interrupt of device 102. Other examples of interrupt mechanism 106 include a capacitive sensor, a combination of key presses (such as CTRL+ALT+DELETE), a power button, or a reset button. Interrupt mechanism 106 may also correspond to a sensor output, such as the aforementioned capacitive sensor indicating a touch made at a predetermined location on a touch screen of device 102, or the output of an accelerometer in device 102 indicating a particular motion, such as a "shake" motion. Interrupt mechanism 106 may comprise many different arrangements of buttons or button sequence so long as the generated interrupt causes a particular action to occur and that the interrupt can only be generated by the user. Consistent with some embodiments, the generated interrupt may cause an acceptance action in some cases or a termination action in other cases.

System 100 further includes remote server 108 also coupled to internet 104. Remote server 108 may be coupled to internet through any wired or wireless connection. Moreover, remote sewer 108 may further include a memory and a processor, wherein the memory includes instructions for execution by the processor for performing methods as described herein. System also includes a clearinghouse 110 that maintains a whitelist 112 and a blacklist 114. Whitelist 112 and blacklist 114 may be communicated to remote server 108 through network 104 or through a direct coupling. Whitelist 112 and blacklist 114 may be dynamically generated. Moreover, whitelist 112 and blacklist 114 may be communicated to device 102 through network 104.

Figure 2:
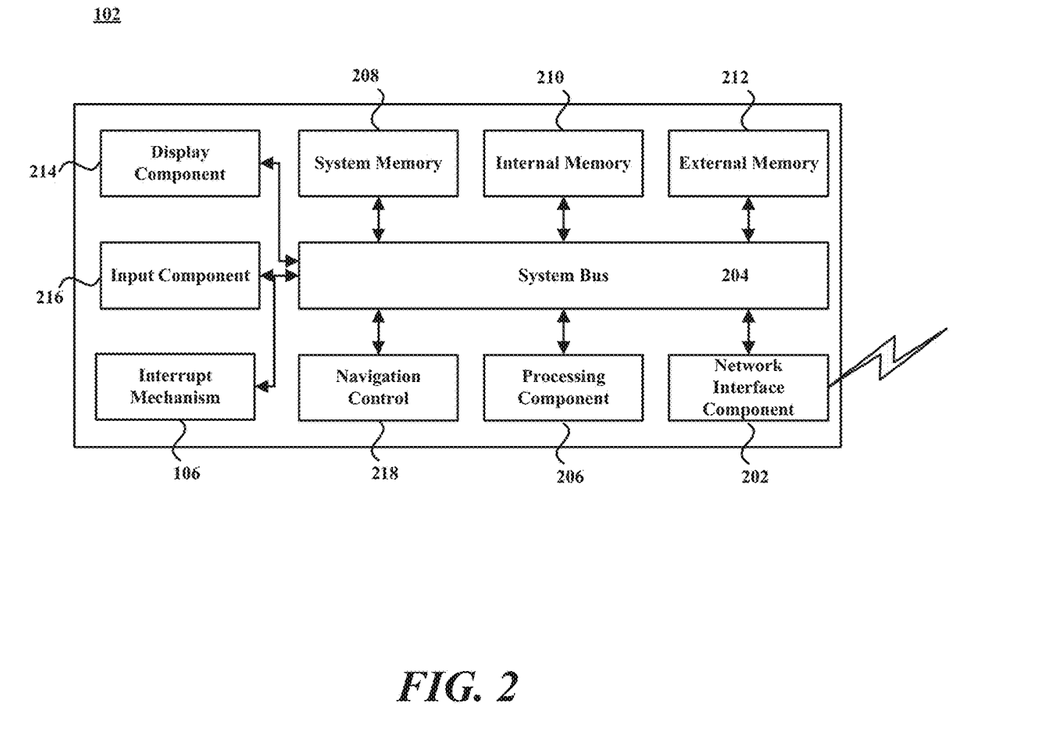
FIG. 2 is a diagram illustrating a device, consistent with some embodiments.

FIG. 2 is a diagram illustrating device 102, consistent with some embodiments. Device 102 may be a mobile device such as a smartphone such as an iPhone™ or iPad™ or other mobile device running the iOS™ operating system, the Android™ operating system, a BlackBerry™ operating system, a Windows™ Mobile operating system, or webOS™. Device 102 may also be a personal computer, laptop computer, netbook, or tablet computer. As shown in FIG. 2, device 102 includes a network interface component (NIC) 202 configured for communication with a network such as network 104 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 104. Consistent with other embodiments, NIC 202 may be configured to interface with a digital subscriber line (DSL) modem, a public switched telephone network (PSTN) modem, an Ethernet device, and/or various other types of wired and/or wireless network communication devices adapted for communication with network 202.

Consistent with some embodiments, device 102 includes a system bus 204 for interconnecting various components within device 102 and communication information between the various components. Such components include a processing component 206, which may be a processor, microcontroller, or a digital signal processor (DSP), a system memory component 208, which may correspond to random access memory (RAM), an internal memory component 210, which may correspond to read-only memory (ROM), and a static memory 212, which may correspond to optical, magnetic, or solid-state memories. Consistent with some embodiments, device 102 further includes a display component 214 for displaying information to a user of device 102. Display component 102 may be an liquid crystal display (LCD) screen, an organic light emitting diode (OLED) screen, an LED screen, a plasma display, or a cathode ray tube (CRT) display. Device 102 may also include an input component 216, allowing for a user of device 102 to input information to device 102. Such information could include payment information such as an amount required to complete a transaction, account information, verification information, or identification information. An input component 216 may include, for example, a keyboard or key pad. Device 102 may further include a navigation control component 218, configured to allow a user to navigate along display component 214. Consistent with some embodiments, navigation control component 218 may be a mouse, a trackball, or other such device. Moreover, if device 102 includes a touch screen, display component 214, input component 216, and navigation control 218 may be a single integrated component, such as a capacitive sensor-based touch screen.

Further consistent with some embodiments, device 102 may include interrupt mechanism 106. Interrupt mechanism 106 may be any mechanism that causes a hardware or software interrupt of device 102. Other examples of interrupt mechanism 106 include a capacitive sensor, a combination of key presses (such as CTRL+ALT+DELETE), a power button, or a reset button. Interrupt mechanism 106 may also correspond to a sensor output, such as the aforementioned capacitive sensor indicating a touch made at a predetermined location on a touch screen of device 102, or the output of an accelerometer in device 102 indicating a particular motion, such as a "shake" motion. Interrupt mechanism 106 may comprise many different arrangements of buttons or button sequence so long as the generated interrupt causes a particular action to occur and the interrupt is only generated by the user. Consistent with some embodiments, the generated interrupt may cause an acceptance action in some cases or a termination action in other cases.

Figure 3A:
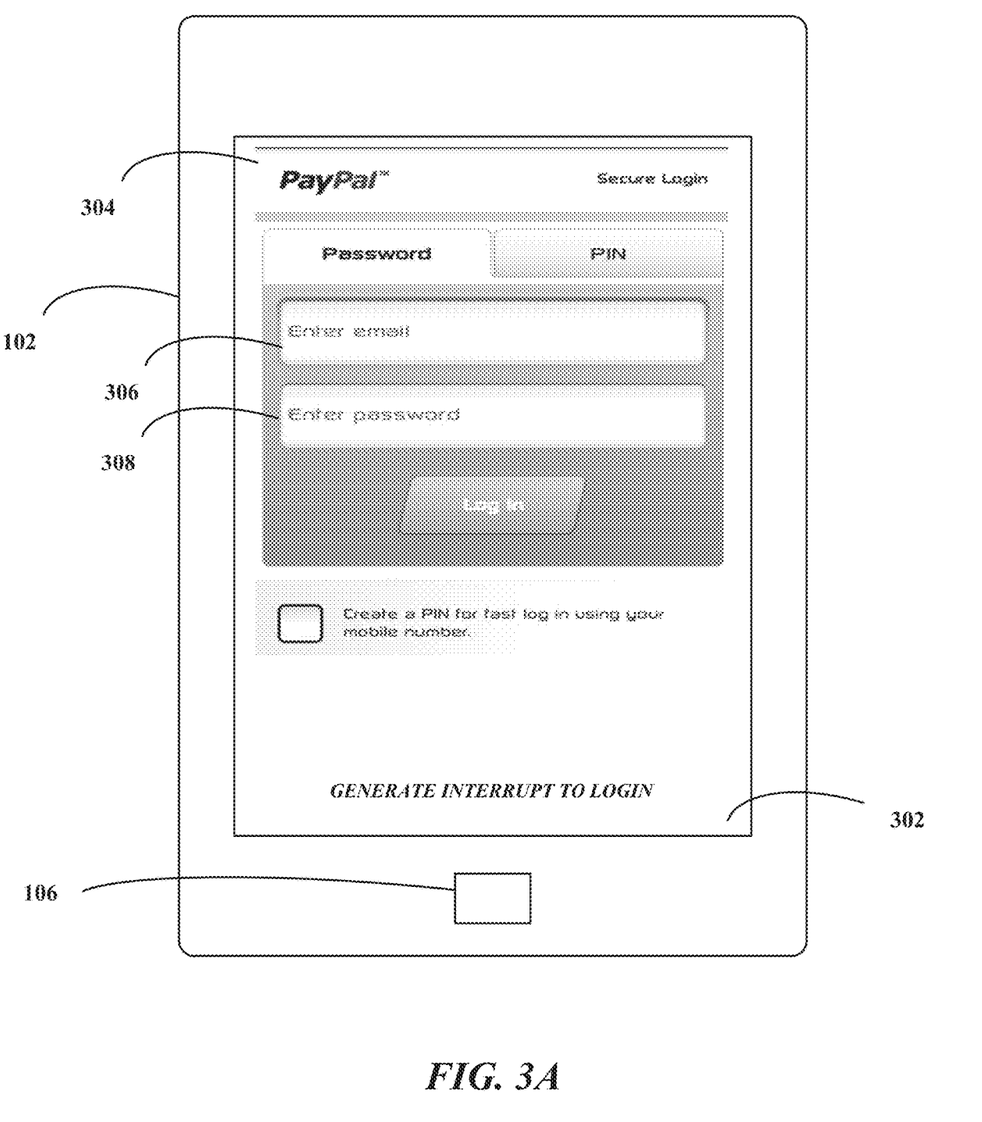
FIGS. 3A-3D are figures illustrating secure and unsecure displays, consistent with some embodiments.

FIGS. 3A-3D are figures illustrating secure and unsecure displays, consistent with some embodiments. As shown in FIG. 3A, device 102 has a display 302 that may be configured to display content such as a login screen 304, consistent with some embodiments. Content as used herein may refer to that which is displayed on the screen and what a user may interact with. Content may include an application, a web page, a context, and/or a login screen associated therewith. Returning to FIG. 3A, login screen 304 may collect sensitive information such as personally identifiable information by, for example, requesting a user name 306 and a password 308. Login screen 304 may collect additional sensitive information, consistent with some embodiments. Such additional sensitive information may be collected by performing a biometric identification reading. Login screen 304 may be a login screen provided by an online payment provider such as PayPal, Inc. of San Jose, Calif. Login screen 304 may be provided by any company or organization requiring a secure login to access or use their services. As shown in FIG. 3A, login screen 304 may also include additional instructions, such as requiring the user to engage interrupt mechanism

106 when login screen 304 is displayed. In particular, FIG. 3A corresponds to a highly trusted user interface, wherein the company, for example PayPal, Inc. of San Jose, Calif., has been certified to display a secure, trusted login screen. Consistent with some embodiments, the presence of the words "Secure Login" and/or "Generate Interrupt to Login" or similar may identify login screen 304 as being a certified secure, trusted login screen. Consistent with further embodiments, the certification of login screen 304 may also include placing login screen 304 on a whitelist, such as whitelist 112.

Figure 3B:
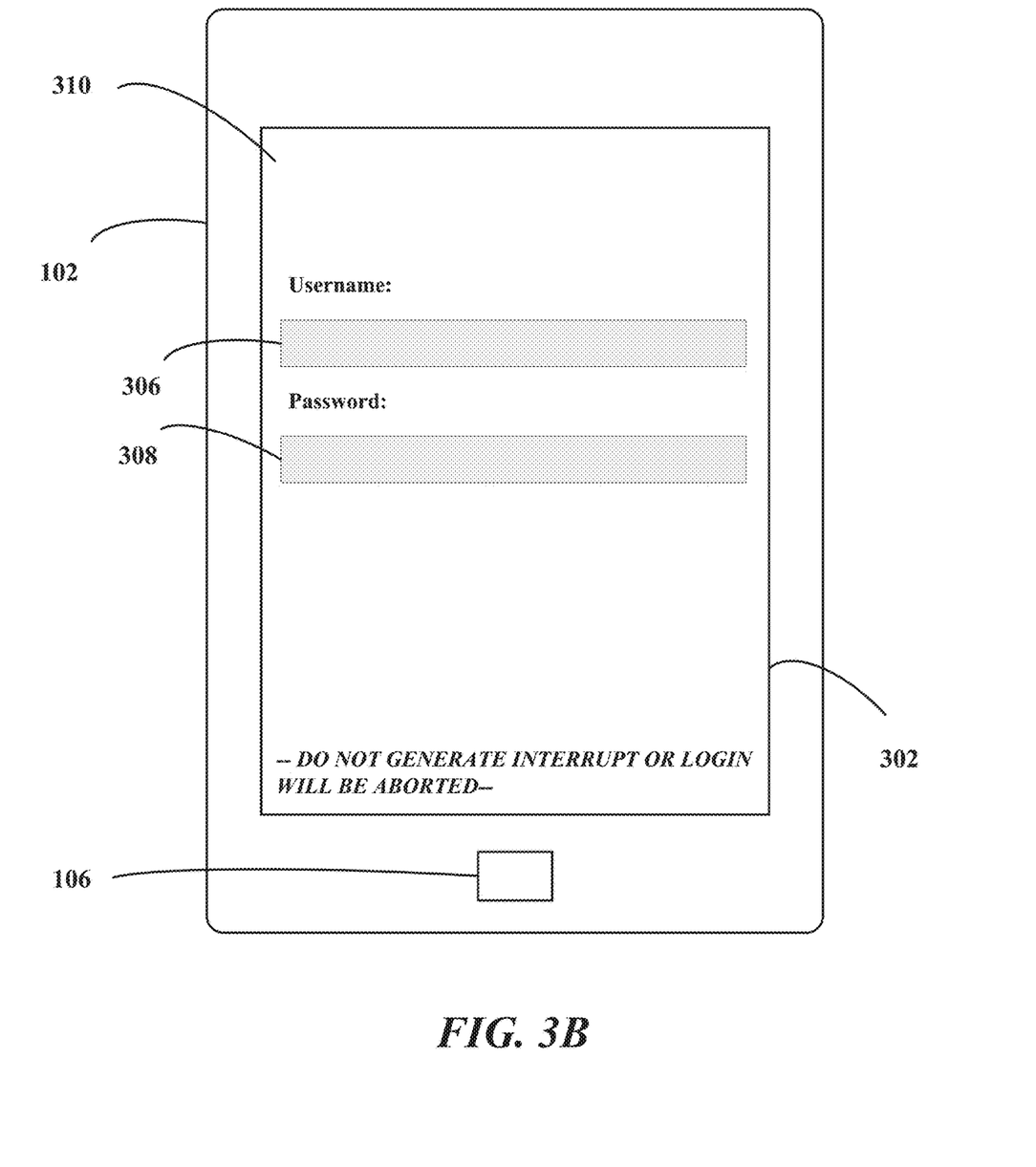

On the other hand, FIG. 3B illustrates an uncertified login screen 310. Although financial institutions and other companies and organizations that deal with financial information may be willing to submit to the scrutiny to be able to be certified and display a certified secure and trusted login screen, recreational sites, news sites, etc., may prefer to use an uncertified login screen, such as login screen 310, which requires no scrutiny at all, and which anybody has the right to produce, whether from an app or from a browser. The user would understand that login screen 310 is not certifiably secure by, for example, the lack of the words "Secure Login" and/or the presence of the words "Do not generate interrupt or login will be aborted". The user could then make the decision, based on their experience, knowledge, and understanding of the type of personal information being associated with the login and the relative harmlessness of the information, to proceed with the login.

Figure 3C:
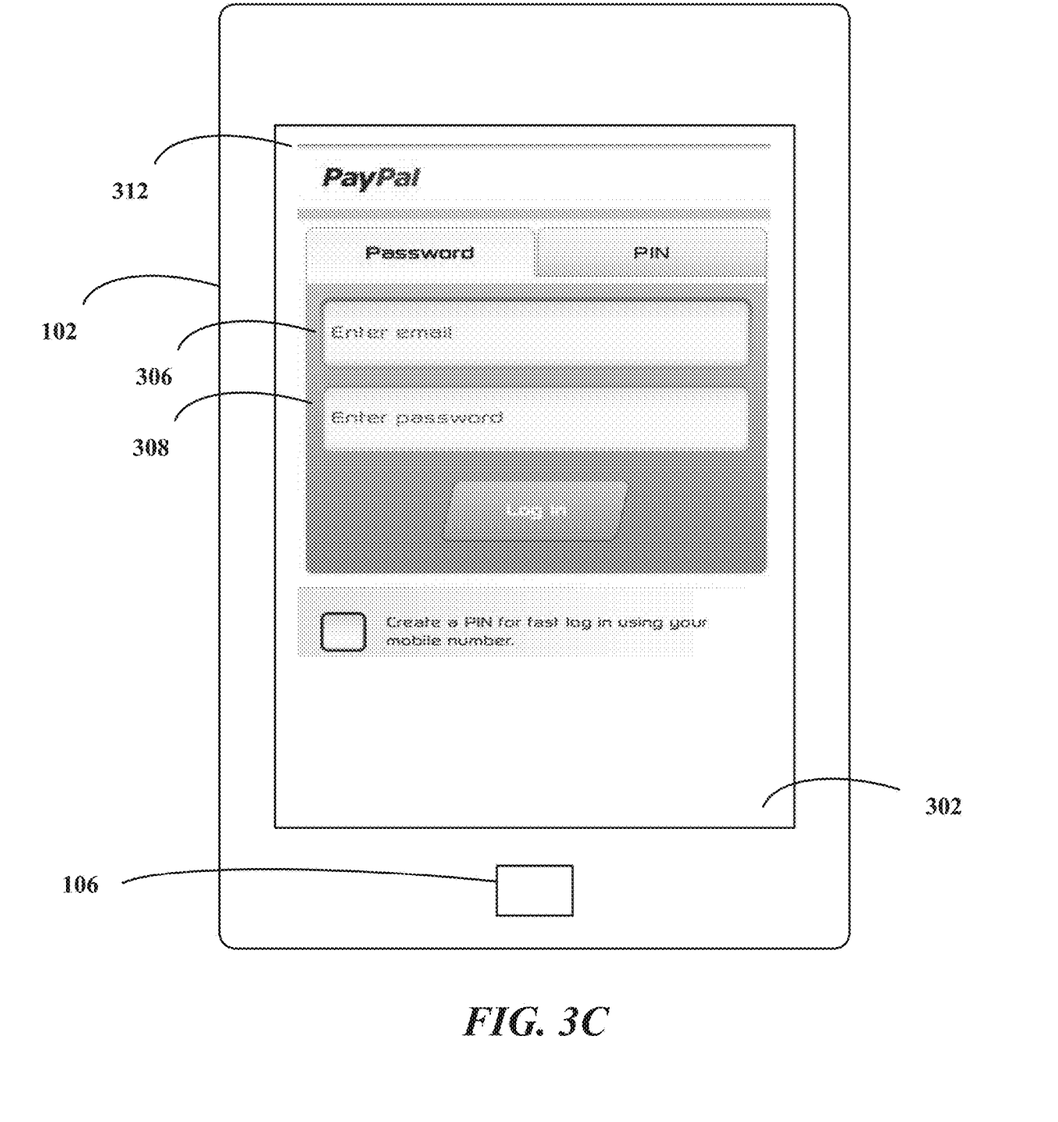

FIG. 3C, however, illustrates a malicious login screen 312 that attempts to mimic or spoof login screen 304. As shown in FIG. 3C, login screen 312 is nearly identical to login screen 304, except it does not include the words "Secure Login" and/or "Generate Interrupt to Login". However, most users may not easily detect the minor differences between login screen 312 and login screen 304 and assume that login screen is the certified and trusted login screen for PayPal shown as login screen 304. As a result, users will be tricked into entering their user name 306 and password 308 on malicious login screen 312, which will then be transmitted to an attacker instead of to PayPal. The attacker can then use the intercepted user name 306 and password 308 to log in to the user's PayPal account and obtain financial or other information.

Consistent with some embodiments, a user used to login screen 304 may be used to, or conditioned to, generate an interrupt by engaging interrupt mechanism 106 when receiving a stimulus, such as seeing login screen 304. According to such embodiments, device 102 may be configured to accept the login process when an interrupt is generated in conjunction with a certified, trusted, or whitelisted login screen such as login screen 304. In addition, generating an interrupt in conjunction with a certified, trusted, or whitelisted login screen such as login screen 304 may also activate a password manager that has previously stored password 308 for login screen 304 and automatically completer password 308. Further, device 102 may be configured to abort or terminate the login process when an interrupt is generated in conjunction with a login screen that is not certified, trusted, or whitelisted, such as login screens 310 and 312. Moreover, device 102 may be configured to abort or terminate the login process when an interrupt is generated in conjunction with a login screen that is blacklisted.

Consistent with some embodiments, instructions, such as a web service or an application ("app") that are certified as secure and trusted and, thus, having the right to display a secure login such as login screen 304 would present some authorization to device 102, along with the data describing what is to be displayed to verify that the application or website has a proper certification. This can be done by verifying a digital signature on the data, or determine that the application or website is listed in whitelist 112 and/or that the data matches the data associated with the app or website by storing a hash of the data along with the identifier of the app or website. Consistent with some embodiments, device 102 may approve any request to display a secure login, such as login screen 304, but encrypts any input using a public key associated with the service provider associated with a given data string governing the appearance (including audio and functionality) of login screen 304. This would allow authorized service providers to modify the appearance of login screen 304 rather quickly. For example, if an authorized application named A were to request device 102 to customize login screen 304 in a particular manner X, that would be automatically approved, but the information the user would input as a result would automatically be encrypted using a public key PK-A for which only A would know the secret key SK-A. Consistent with such embodiments, this particular approach would allow trusted entities to impersonate secure login screens 304. To avoid the risks associated with compromise of one trusted site leading to a breach of others', this mechanism can be combined with other authorization verification: There may still be verification of authorization, and some of the data fields may be verified in that way, while others are ignored.

Figure 3D:
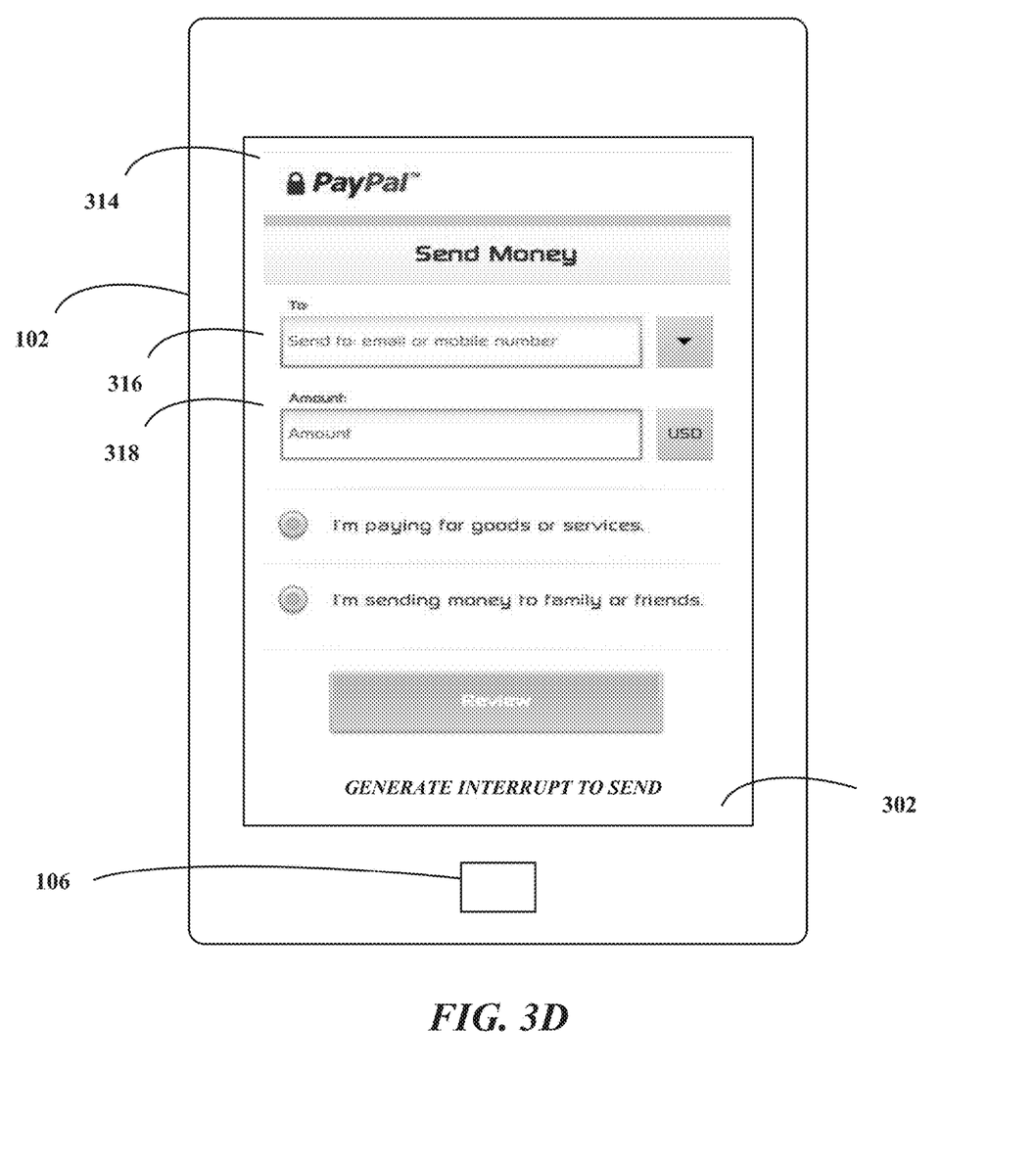

FIG. 2D illustrates a secure interface 314 for making payments. Consistent with some embodiments, a payment interface can be seen as a generalization of a login interface. Consider payment interface 314 where the payer is asked an amount 316 and recipient 318 for providing a payment. To confirm this payment, the payer may be required to enter a password on a subsequent screen or in a popup screen. However, a malicious webpage may display imagery that makes the user believe that a payment is about to be made to an intended recipient, and will enter the password. However, the password would be intercepted by the malicious website and transmitted to the attacker, who may then perform a much larger transfer to any payee of his choice—or simply steal the password. Consistent with such embodiments, payment interface 314 may require an interrupt to be generated to prevent such an attack, potentially but not necessarily followed by entering the password. Similar to secure login 304, only certified and trusted applications or websites may be approved to use the secure interface requiring the generation of the interrupt wherein the generation of the interrupt causes the payment to be accepted. Consistent with some embodiments, the malicious webpage or application trying to mimic a secure interface would be terminated by the generation of the interrupt.

Consistent with some embodiments, the requirement of certified and trusted webpages and/or applications to generate an interrupt, wherein the generation of the interrupt causes an acceptance or initiation of a desired action and the termination or abortion of a malicious action may be enabled by modifying the operating system, leveraging the interrupt handler of the operating system, by implementing appropriate middleware, modifying a browser or other application manager, or by modifying device firmware, or through combining one or more of these modifications. Consistent with further embodiments, the web browser executing on device 102 may be configured to detect HyperText Markup Language (HTML) tags of the displayed webpage and, when detecting tags that require the input of a login or password, or indicate a certified and trusted site, may use a scripting language such as JavaScript to inject instructions into the domain of the displayed webpage to accept an action upon the generation of an input.

Consistent with some embodiments, secure login screen 304 or payment interface 314 may only be displayed if the interrupt is generated and a verification step is passed. Consistent with some embodiments, such as specifically shown in FIGS. 3A and 3D, login screen 304 or payment interface 314 is displayed along with a prompt to generate an interrupt. Consistent with such embodiments, users may become conditioned to generate an interrupt when they see login screen 304 or payment interface 314 which would further provide a conditioning to cancel unwanted or malicious operations that attempt to mimic legitimate operations, whether logins, payments or other. According to other embodiments, a prompt may initially be shown to user to generate an interrupt, and after the interrupt is generated, appropriate verification is performed, and if passed, login screen 304 or payment screen 214 or other screen may then be displayed and made available to the user.

Figure 4:
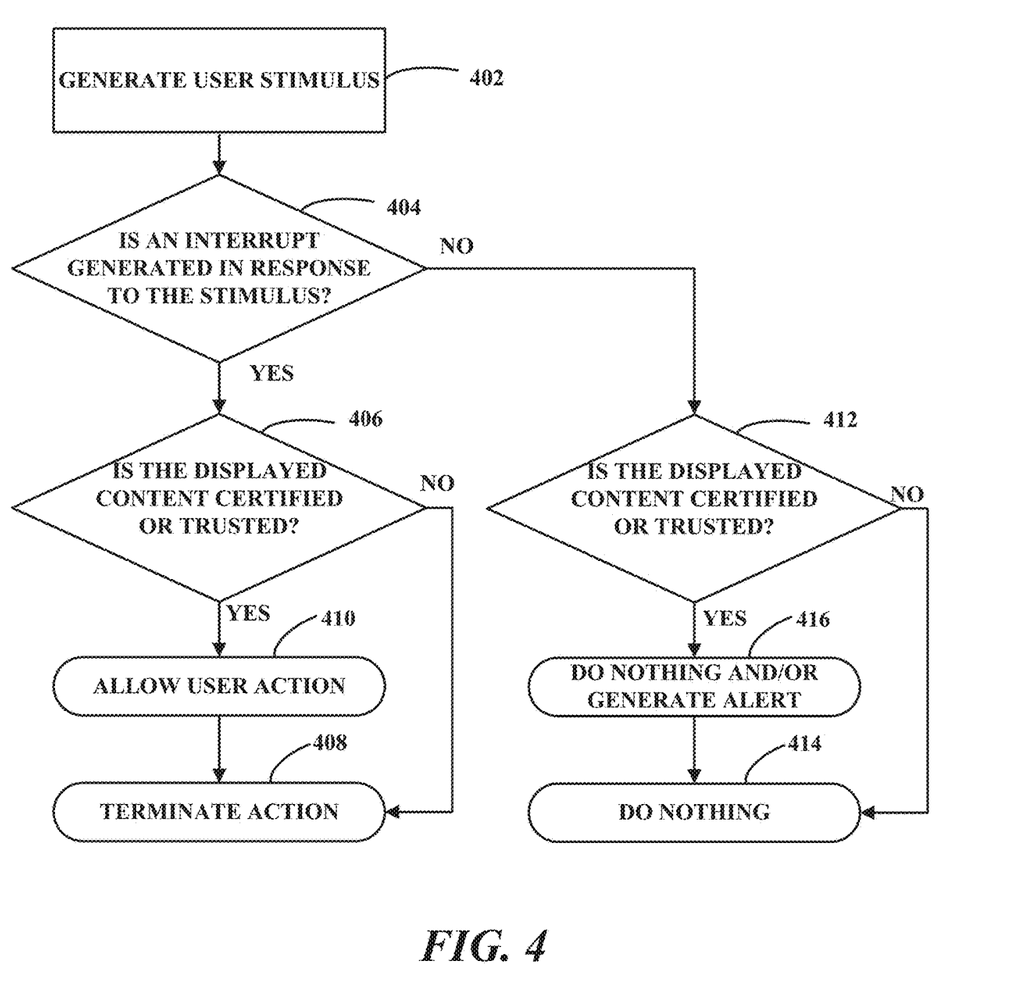
FIG. 4 is a flowchart illustrating a method for allowing or terminating a user action, consistent with some embodiments.

FIG. 4 is a flowchart illustrating a method for allowing or terminating a user action, consistent with some embodiments. For the purpose of illustration, the steps of FIG. 4 will be discussed in conjunction with FIGS. 1, 2, and 3A-3D. When a user navigates to a webpage, or executes an application, using device 102, processing component 206 executes instructions stored in system memory 208 to, for example, determine if the webpage or application requires the entry of sensitive information. The sensitive information may include a user name 306, a password 308, a recipient of a payment 316, a payment amount 316, or other personal or financial information. The instructions stored in system memory 208 executed by processing component 206 may look for HTML tags of the displayed webpage, or other software code of the executing application to determine if the webpage or application requires the entry of sensitive information. If the application or webpage requires sensitive information, instructions stored in system memory 208, internal memory 210, or external memory 212 (simply referred to as "device memory") will, when executed by processing component 206, configure processing component 206 to generate a user stimulus on display 302 (step 402). The user stimulus may include a login screen, such as login screens 304, 310, 312, or a payment interface 314. According to some embodiments, the user stimulus could include a visual stimulus, an audible stimulus, or a touch stimulus. Processing component 206 will determine if an interrupt is generated in response to the stimulus (step 404). Consistent with some embodiments, the interrupt can be generated by activating interrupt mechanism 106. Other examples of interrupt mechanism 106 include a capacitive sensor, a combination of key presses (such as CTRL+ALT+DELETE), a power button, or a reset button. Interrupt mechanism 106 may also correspond to a sensor output, such as the aforementioned capacitive sensor indicating a touch made at a predetermined location on a touch screen of device 102, or the output of an accelerometer in device 102 indicating a particular motion, such as a "shake" motion. Interrupt mechanism 106 may comprise many different arrangements of buttons or button sequence so long as the generated interrupt causes a particular action to occur and the interrupt is only generated by the user.

If processing device 206 detects that an interrupt was generated, processing device 206 will execute instructions stored in device memory to determine if the displayed content, which may be the executing application or webpage, is certified or trusted (step 406). Determining whether the displayed content is certified or trusted may include determining if there is a certificate associated with the content or determining if the content is on whitelist 112. Consistent with some embodiments, detection of a generated interrupt may cause processing device to execute instructions stored in device memory that, when executed, cause device 102 to enter a trust zone where trusted software instructions may be executed. Alternatively, successful generation of the interrupt may also initiate a hardware or software scan to look for malicious code within device, such as viruses or keyloggers to ensure that the user information will not be intercepted. If the displayed content is not certified or trusted, an alternative action is taken (step 408). Consistent with some embodiments, the alternative action includes terminating the action. By terminating actions associated with uncertified or untrusted content, attackers attempting to trick the user with a mimicked interface, such as login screen 312, the attacker's attempts to intercept the personally identifiable information would be thwarted. Even if a user navigates back to the same uncertified or untrusted content, generates the interrupt again, the action would be again terminated. After a few attempts, the user would likely understand that there are issues surrounding the content and would no longer attempt to navigate to the content and enact the action. According to some embodiments, the user could also report the content to a third party, such as clearing house 110. If the content is certified or trusted (e.g., on whitelist 112), user action will be allowed (step 410). The user action may include allowing the user to login to the content, to send money to a recipient, prompting the user for supplemental verification, or allowing the user to use a password manager which could automatically fill in the details of login screen 304. Further, the user action may also initiate a hardware or software scan to look for malicious code within device, such as viruses or keyloggers to ensure that the user information will not be intercepted.

If an interrupt is not generated in response to the stimulus, processing device 206 will execute instructions stored in device memory to determine if the displayed content, which may be the executing application or webpage or context, is certified or trusted (step 412). Determining whether the displayed content is certified or trusted may include determining if there is a certificate associated with the content or determining if the content is on whitelist 112. Alternatively, determining if the content is trusted may include using a rule-based system or anomaly-based system to analyze the content to determine if the content is certified or trusted. If the displayed content is not certified or trusted, the instructions instruct the processor to do nothing and the user can interact with the content normally (step 414). However, in the context of generating an interrupt, "normally" means that the content is terminated. It is also possible that when content (defined above to mean many things, including an application, a webpage, a user interface, a login screen, or a context) is not whitelisted, but also not blacklisted, that the user is asked to make a judgment call whether to trust the content, or not. Moreover, the user can be given additional information at this point, and be prompted to respond to requests for information, such as "Do you think this is secure?". If a site is not whitelisted, but not malicious, it may have text or imagery instructing the user not to generate an interrupt. However, the user would know that this means that it is not a secure site, and that he or she has to make a judgment call on his or her own on whether or not to continue. If the displayed content is certified or trusted, for example, is on whitelist 112, the instructions instruct processing device 206 to do nothing and the user can interact with the content normally and an alert will be generated (step 416). The alert may remind the user to generated an interrupt in response to the stimulus. In addition, instructions stored in device memory may, when executed by processing component 206, configure the processing component to send out information over network indicating that the user did not generate an interrupt. Remote server 108, for example, may store information regarding the user's interrupt generation, which could be used to generate a user score regarding the likeliness of the user to generate an interrupt in response to the stimulus. The user score may further provide information regarding whether or not the user is at risk to being tricked by an attacker.

Figure 5:
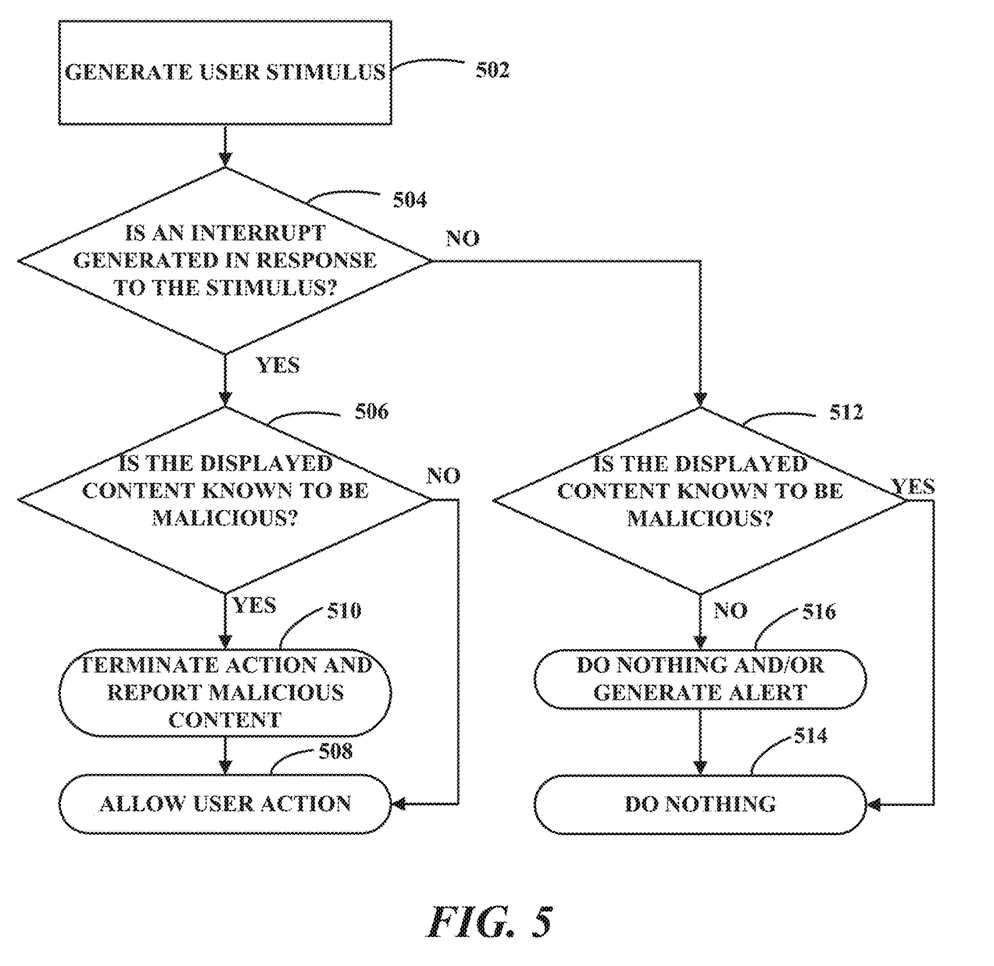
FIG. 5 is a flowchart illustrating a method for allowing or terminating a user action, consistent with some embodiments.

FIG. 5 is a flowchart illustrating a method for allowing or terminating a user action, consistent with some embodiments. For the purpose of illustration, the steps of FIG. 5 will be discussed in conjunction with FIGS. 1, 2, and 3A-3D. When a user navigates to a webpage, or executes an application, using device 102, processing component 206 executes instructions stored in system memory 208 to, for example, determine if the webpage or application requires the entry of sensitive information. The sensitive information may include a user name 306, a password 308, a recipient of a payment 316, a payment amount 316, or other personal or financial information. The instructions stored in system memory 208 executed by processing component 206 may look for HTML tags of the displayed webpage, or other software code of the executing application to determine if the webpage or application requires the entry of sensitive information. If the application or webpage requires sensitive information, instructions stored in system memory 208, internal memory 210, or external memory 212 (simply referred to as "device memory") will, when executed by processing component 206, configure processing component 206 to generate a user stimulus on display 302 (step 502). The user stimulus may include a login screen, such as login screens 304, 310, 312, or a payment interface 314. According to some embodiments, the user stimulus could include a visual stimulus, an audible stimulus, or a touch stimulus. Processing component 206 will determine if an interrupt is generated in response to the stimulus (step 504). Consistent with some embodiments, the interrupt can be generated by activating interrupt mechanism 106. Other examples of interrupt mechanism 106 include a capacitive sensor, a combination of key presses (such as CTRL+ALT+DELETE), a power button, or a reset button. Interrupt mechanism 106 may also correspond to a sensor output, such as the aforementioned capacitive sensor indicating a touch made at a predetermined location on a touch screen of device 102, or the output of an accelerometer in device 102 indicating a particular motion, such as a "shake" motion. Interrupt mechanism 106 may comprise many different arrangements of buttons or button sequence so long as the generated interrupt causes a particular action to occur.

If processing device 206 detects that an interrupt was generated, processing device 206 will execute instructions stored in device memory to determine if the displayed content, which may be the executing application or webpage, is known to be malicious (step 506). Determining whether the displayed content is known to be malicious may include examining the content for malicious files or determining if the content is on blacklist 114. Alternatively, determining if the content is trusted may include using a rule-based system or anomaly-based system to analyze the content to determine if the content is malicious. Consistent with some embodiments, detection of a generated interrupt may cause processing device to execute instructions stored in device memory that, when executed, cause device 102 to enter a trust zone where trusted software instructions may be executed. Alternatively, successful generation of the interrupt may also initiate a hardware or software scan to look for malicious code within device, such as viruses or keyloggers to ensure that the user information will not be intercepted. If the displayed content is known to be malicious, an alternative action is taken (step 508). Consistent with some embodiments, the alternative action includes terminating the action. By terminating actions associated with uncertified or untrusted content, attackers attempting to trick the user with a mimicked interface, such as login screen 312, the attacker's attempts to intercept the user information would be thwarted. Even if a user navigates back to the same uncertified or untrusted content, generates the interrupt again, the action would be again terminated. After a few attempts, the user would likely understand that there are issues surrounding the content and would no longer attempt to navigate to the content and enact the action. According to some embodiments, the user could also report the content to a third party, such as clearing house 110. Further, if the user believes that the classification of the content as malicious is in error, the user can also report this to clearing house 110. If the content is not known to be malicious (e.g., not on blacklist 114), user action will be allowed (step 510). The user action may include allowing the user to login to the content, to send money to a recipient, prompting the user for supplemental verification, or allowing the user to use a password manager which could automatically fill in the details of login screen 304.

If an interrupt is not generated in response to the stimulus, processing device 206 will execute instructions stored in device memory to determine if the displayed content, which may be the executing application or webpage, is known to be malicious (step 512). Determining whether the displayed content is certified or trusted may include determining if there is malicious code associated with the content or determining if the content is on blacklist 114. If the displayed content is not certified or trusted, the instructions instruct the processor to do nothing and the user can interact with the content normally (step 514). However, in the context of generating an interrupt, "normally" means that the content is terminated. It is also possible that when content is not whitelisted, but also not blacklisted, that the user is asked to make a judgment call whether to trust the content, or not. Moreover, the user can be given additional information at this point, and be prompted to respond to requests for information, such as "Do you think this is secure?". If a site is not whitelisted, but not malicious, it may have text or imagery instructing the user not to generate an interrupt. However, the user would know that this means that it is not a secure site, and that he or she has to make a judgment call on his or her own on whether or not to continue. If the displayed content is known to be malicious, for example, is on blacklist 114, the instructions instruct processing device 206 to do nothing and the user can interact with the content normally and an alert will be generated (step 516). The alert may remind the user to generate an interrupt in response to the stimulus. In addition, instructions stored in device memory may, when executed by processing component 206, configure the processing component to send out information over network indicating that the user did not generate an interrupt. Remote server 108, for example, may store information regarding the user's interrupt generation, which could be used to generate a user score regarding the likeliness of the user to generate an interrupt in response to the stimulus. The user score may further provide information regarding whether or not the user is at risk to being tricked by an attacker.

Figure 6:
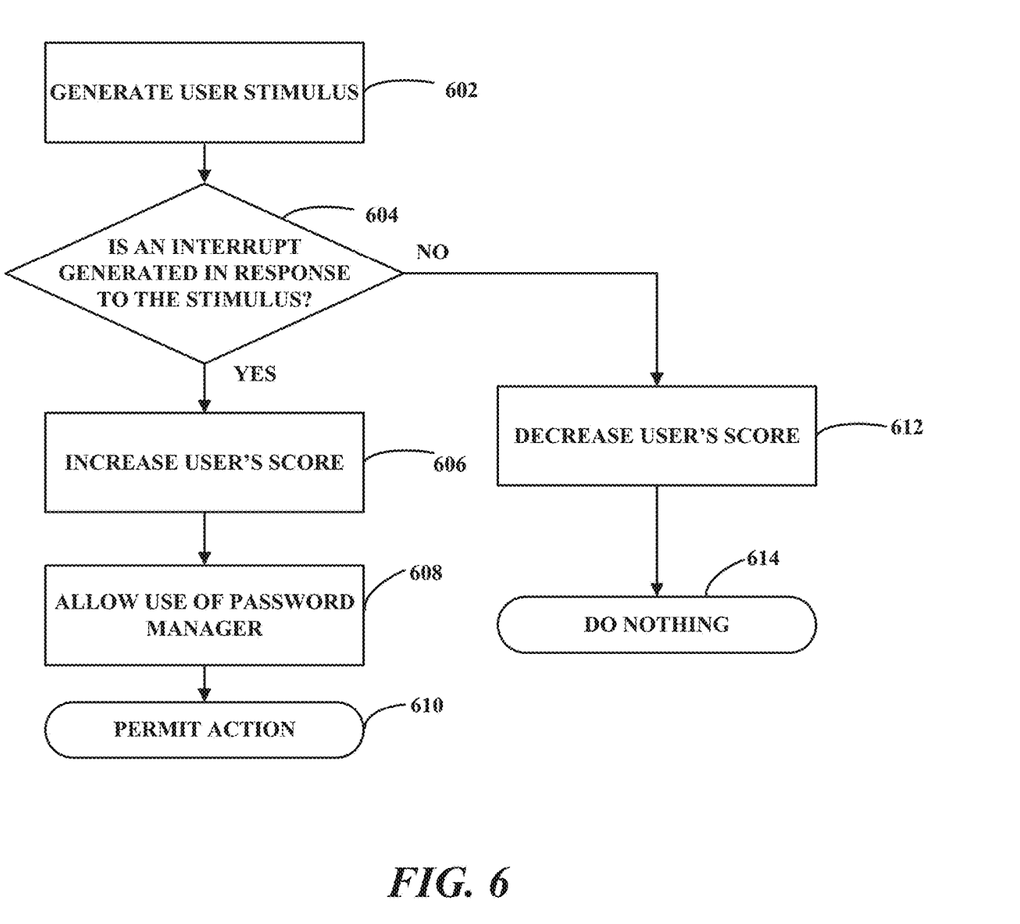
FIG. 6 is a flowchart illustrating a method for training a user to generate an interrupt, consistent with some embodiments.

Consistent with some embodiments, users need to be trained to generate an interrupt using interrupt generation mechanism 106 when presented a stimulus such as login screen 304 to fully realize the benefits of the systems, methods, and devices disclosed herein. FIG. 6 is a flowchart illustrating a method for training a user to generate an interrupt, consistent with some embodiments. For the purpose of illustration, the steps of FIG. 6 will be discussed in conjunction with FIGS. 1, 2, and 3A-3D. When a user navigates to a webpage, or executes an application, using device 102, processing component 206 executes instructions stored in system memory 208 to, for example, determine if the webpage or application requires the entry of sensitive information. The sensitive information may include a user name 306, a password 308, a recipient of a payment 316, a payment amount 316, or other personal or financial information. The instructions stored in system memory 208 executed by processing component 206 may look for HTML, tags of the displayed webpage, or other software code of the executing application to determine if the webpage or application requires the entry of sensitive information. If the application or webpage requires sensitive information, instructions stored in system memory 208, internal memory 210, or external memory 212 (simply referred to as "device memory") will, when executed by processing component 206, configure processing component 206 to generate a user stimulus on display 302 (step 602). The user stimulus may include a login screen, such as login screens 304, 310, 312, or a payment interface 314. According to some embodiments, the user stimulus could include a visual stimulus, an audible stimulus, or a touch stimulus. Processing component 206 will determine if an interrupt is generated in response to the stimulus (step 604). Consistent with some embodiments, the interrupt can be generated by activating interrupt mechanism 106. Other examples of interrupt mechanism 106 include a capacitive sensor, a combination of key presses (such as CTRL+ALT+DELETE), a power button, or a reset button. Interrupt mechanism 106 may also correspond to a sensor output, such as the aforementioned capacitive sensor indicating a touch made at a predetermined location on a touch screen of device 102, or the output of an accelerometer in device 102 indicating a particular motion, such as a "shake" motion. Interrupt mechanism 106 may comprise many different arrangements of buttons or button sequence so long as the generated interrupt causes a particular action to occur.

If processing device 206 detects that an interrupt was generated, processing device 206 will execute instructions stored in device memory to increase a score associated with the user (step 606). The user score may be a reliability score, and may be maintained by the website host, application host, clearinghouse 110, remote server 108, a provider such as PayPal, Inc., or a combination thereof. The user score could be used by websites to determine if the user is consistent in generating an interrupt to determine the likelihood that the user may have their sensitive information collected by an attacker by not consistently generating the interrupt. Weak scores may be subject to additional authentication steps including out-of band authentication like short messaging service (SMS) one time Passwords or answering additional question challenges. Then, as a "reward" for successfully generating the interrupt, the user may be allowed use of a password manager that stores user login information (step 610). Then, user action will be permitted (step 612). Alternatively, the use of a password manager in response to successfully generating the interrupt may be a configuration option set by the user.

If an interrupt is not generated in response to the stimulus, processing device 206 will execute instructions stored in device memory to decrease the user's score (step 612) and not allow the user to take any further action on the displayed content (step 614). Processing device 206 may then further give feedback to the user that the user should have generated an interrupt. Consistent with some embodiments, the training method described in FIG. 6 may be integrated into and used with the methods described in FIGS. 4 and 5.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide methods, systems, and devices capable of decreasing the likelihood that a user is tricked into disclosing personal or financial information to an attacker. In particular, embodiments as described herein may leverage a user's conditioning to take a particular action when presented with a stimulus, wherein the particular action provides beneficial results for trusted secure content and terminates or aborts malicious content. The examples provided above are exemplary only and are not intended to be limiting. One skilled in the art may readily devise other systems consistent with the disclosed embodiments which are intended to be within the scope of this disclosure. As such, the application is limited only by the following claims.

We claim:
1. A system, comprising:
a non-transitory memory; and
one or more hardware processors coupled to the non-transitory memory and configured to read instructions from the non-transitory memory to cause the system to perform operations comprising:
determining that a user-authentication screen is provided on a display of a user device of a user;
detecting, via one or more sensors of the user device, a generation of an interrupt on the user device;
determining whether the user-authentication screen is from a trusted source; and
automatically providing, in response to the detecting of the generation of the interrupt and a determination that the user-authentication screen is from the trusted source, a user-authentication credential to the user device.

2. The system of claim 1, wherein:
the user device comprises a mobile device; and
the one or more sensors comprise one or more buttons, keys, capacitive sensors, or accelerometers.

3. The system of claim 2, wherein the detecting comprises detecting a pressing of one of the buttons or keys.

4. The system of claim 2, wherein the detecting comprises detecting that a plurality of the buttons or keys have been pressed according to a predefined combination or a predefined sequence.

5. The system of claim 2, wherein the detecting comprises detecting, via the one or more capacitive sensors, an engagement of a predefined portion of the user-authentication screen.

6. The system of claim 2, wherein the detecting comprises detecting, via the one or more accelerometers, that the user device has moved or is moving in a predefined motion.

7. The system of claim 1, wherein the automatically providing comprises activating a password manager application that has stored a password that has been entered by the user previously, and wherein the activating of the password manager application automatically fills a portion of the user-authentication screen with the password as the user-authentication credential.

8. The system of claim 1, wherein the determining whether the user-authentication screen is from the trusted source comprises determining whether a content of the user-authentication screen includes a predefined certificate or whether the content of the user-authentication screen is on a predefined whitelist.

9. The system of claim 1, wherein the operations further comprise: in response to the detecting of the generation of the interrupt and a determination that the user-authentication screen is not from the trusted source, automatically scanning the user device for malicious code.

10. The system of claim 9, wherein the malicious code comprises a computer virus or a keylogger software.

11. The system of claim 1, wherein the operations further comprise: in response to the detecting of the generation of the interrupt and a determination that the user-authentication screen is not from the trusted source, automatically terminating a user-authentication process associated with the user-authentication screen.

12. The system of claim 1, wherein the operations further comprise: before the detecting, prompting the user to generate the interrupt.

13. A method, comprising:
 determining that a user-authentication screen is provided to a user device of a user, wherein the user device includes one or more buttons, keys, capacitive sensors, or accelerometers;
 detecting a generation of an interrupt on the user device via an operation selected from the group consisting of:
  a pressing of one of the buttons or the keys;
  pressings of a plurality of the buttons or the keys according to a predefined combination or a predefined sequence;
  a detection made via the one or more capacitive sensors indicating an engagement of a predefined portion of the user-authentication screen; or
  a detection made via the one or more accelerometers indicating the user device has moved or is moving in a predefined motion;
 determining whether the user-authentication screen is from a trusted source; and
 automatically populating, in response to the detecting of the generation of the interrupt and a determination that the user-authentication screen is from the trusted source, a data field of the user-authentication screen with a user-authentication credential.

14. The method of claim 13, wherein prior to the automatically populating, automatically activating a password manager application that has stored a previously-entered password as the user-authentication credential.

15. The method of claim 13, wherein the determining whether the user-authentication screen is from the trusted source comprises determining whether a content of the user-authentication screen includes a predefined certificate or whether the content of the user-authentication screen is on a predefined whitelist.

16. The method of claim 13, further comprising: in response to the detecting of the generation of the interrupt and a determination that the user-authentication screen is not from the trusted source, automatically scanning the user device for a computer virus or a keylogger software.

17. The method of claim 13, further comprising: in response to the detecting of the generation of the interrupt and a determination that the user-authentication screen is not from the trusted source, automatically terminating a user-authentication process associated with the user-authentication screen.

18. The method of claim 13, further comprising: before the detecting, displaying a prompt on the user-authentication screen with respect to the generation of the interrupt.

19. A non-transitory machine-readable medium having stored thereon machine-readable instructions executable to cause a machine to perform operations comprising:
 detecting a generation of an interrupt on a user device via one or more of the following:
  a pressing of one of buttons or keys;
  pressings of a plurality of buttons or keys according to a predefined combination or a predefined sequence;
  a detection made via one or more capacitive sensors indicating an engagement of a predefined portion of a user-authentication screen; or
  a detection made via one or more accelerometers indicating that the user device has experienced or is experiencing a predefined motion;
 determining whether the user-authentication screen is from one or more trusted entities; and
 in response to a detection of the generation of the interrupt, automatically performing one of the following actions based on the determining:
  automatically entering a user-authentication credential in the user-authentication screen when the user-authentication screen is determined to come from one of the trusted entities; or
  terminating an authentication process associated with the user-authentication screen when the user-authentication screen is determined to not come from any of the trusted entities.

20. The non-transitory machine-readable medium of claim 19, wherein the operations further comprise: in response to a detection of the generation of the interrupt, automatically scanning content of the user-authentication screen for malicious code.

* * * * *